United States Patent [19]

Davis

[11] Patent Number: 4,793,284
[45] Date of Patent: Dec. 27, 1988

[54] APPARATUS AND PROCESS FOR OBTAINING MARKETABLE SHELLFISH

[76] Inventor: Roy E. Davis, 16 Laydon Way, Poquoson, Va. 23662

[21] Appl. No.: 53,008

[22] Filed: May 22, 1987

[51] Int. Cl.⁴ .................. A01K 61/00; A01K 80/00
[52] U.S. Cl. ................................. 119/4; 56/8; 119/17
[58] Field of Search .......... 119/2, 4, 17; 56/8, 56/9; D30/4; 43/58, 61

[56] References Cited

U.S. PATENT DOCUMENTS

| | | | |
|---|---|---|---|
| 788,163 | 4/1905 | Mitchell | 43/58 |
| 1,297,893 | 3/1919 | Nash | 48/61 |
| 2,989,945 | 7/1961 | Ford | 119/4 |
| 3,624,932 | 12/1971 | Doyle | 119/4 |
| 3,702,599 | 11/1972 | Herolzer | 119/4 |
| 4,061,110 | 12/1977 | Steidle | 119/4 |
| 4,266,509 | 5/1981 | Gollott et al. | 119/2 |
| 4,328,764 | 5/1982 | Nickel | 119/4 |
| 4,344,384 | 8/1982 | Rowley | 119/4 |
| 4,377,987 | 3/1983 | Satre | 119/4 |
| 4,395,970 | 8/1983 | Kunkle | 119/4 |
| 4,621,588 | 11/1986 | Harris | 119/4 |

Primary Examiner—Paul J. Hirsch
Attorney, Agent, or Firm—Wallace J. Nelson

[57] ABSTRACT

Apparatus and process for improving the yield of harvested marketable shellfish obtained originally from contaminated water sources including a stainless steel enclosure 12, formed of an angle bar open frame defining a bottom 19, four sides (not designated) and an open top 20. A pair of hinged closure doors 22, 23 serve to selectively close top 20 of enclosure 12. A heavy gauge stainless steel mesh 21 is welded to the frame of enclosure 12 and doors 22, 23. In operation, contaminated shellfish 13 are harvested from known contaminated waters under the supervision of a government inspector. Enclosure 12 is filled with the contaminated shellfish to a depth of approximately six-inches, or approximately half-volume, and the inspector seals the container with seal 30 through eyelets 27, 28. Seal 30 is numbered and/or dated by the crimping tool at 30a and the enclosure transported to and deployed in known uncontaminated waters for a period of at least fifteen days. The enclosure location is marked by identification buoy 17 attached to enclosure 12 via rope 16. After the fifteen day self-purging by the shellfish they are considered clean and may be marketed. The enclosure 12 is then retrieved by grasping ring 18 with suitable on-board harvesting gear and seal 30 may then be broken (under the supervision of the government inspector) and the clean shellfish removed. The yield for this "second" harvest has proved to be approximately ninety-five percent of the first harvest with the approximately five percent loss being due to shell breakage during handling. This is in comparison to an approximately eighty percent maximum recovery where the shellfish are deployed directly onto the bottom of the uncontaminated water for their self-purging stay.

10 Claims, 1 Drawing Sheet

APPARATUS AND PROCESS FOR OBTAINING MARKETABLE SHELLFISH

BACKGROUND OF THE INVENTION

Due to the increasing problem of water contamination from coliform bacteria, and the like, the harvesting of marketable shellfish has become very selective, more time consuming and more expensive. It has been found that shellfish, harvested from contaminated waters and transported to and placed in uncontaminated waters for at least fifteen days, will purge themselves of contaminants and become marketable. This has greatly increased the sources and availability of marketable shellfish.

It is a requirement in the State of Virginia that commercial fishermen harvesting in known contaminated waters must do so in the presence of, and under the supervision of Virginia Resources Commission inspectors. These inspectors place a seal on the truck or other conveying vehicle at the point of harvesting to insure that none of the contaminated products reach the market place. This sealed vehicle is then taken to a known uncontaminated body of water where, again under the supervision of an inspector, the seal may be broken and the contaminated shellfish loaded onto a boat and dispersed in the uncontaminated body of water.

The area where the contaminated shellfish are dispersed or planted is then marked by the inspector and the fisherman by suitable stakes and/or identification buoys. After a period of at least fifteen days this area is then raked or dredged to retrieve the now marketable shellfish that meet the requirements of the Virginia State Health Department. Due to normal loss in the sand or mud, cracking of shells during handling and natural marine predators, the yield of the second harvest seldom exceeds eighty percent of the first harvest.

DESCRIPTION OF THE PRIOR ART

It has previously been proposed to place contaminated shellfish in a plurality of trays, position these trays on suitable racks in a frame work and deposit the entire framework in uncontaminated waters for a period of at least fifteen days to permit the contaminated shellfish to purge themselves. A system of this type is disclosed in U.S. Pat. No. 4,266,509 to Gollott. Although the Gollott system appears to be an improvement over replanting the contaminated shellfish directly on the bottom of an uncontaminated body of water, it still presents problems. For example, the rack proposed by Gollott is extremely heavy and bulky, requiring heavy cranes or machinery to permit positioning and retrieval thereof from a body of uncontaminated water. These requirements restrict the use of the Gollott device to large boats and to large operations. Many independent commercial fishermen have small boats and limited finances and are therefore unable to use the Gollott device. Further, the use of the open tray system of Gollott would still require strict control by marine inspectors and would not be as efficient as the present invention.

BRIEF DESCRIPTION OF THE INVENTION

There is thus a define need in the art for a simple, efficient, and economical system to improve the yield of harvested marketable shellfish from originally contaminated sources.

It is therefore an object of the present invention to provide an improved apparatus for harvesting marketable shellfish from contaminated waters.

It is another object of the present invention is to provide an apparatus for improving the yield of shellfish collected from contaminated waters and placed in uncontaminated waters for the period of time necessary to permit the shellfish to purge themselves of contaminants.

A further object of the present invention is to minimize the work load of the commercial fisherman and the marine inspectors when harvesting contaminated shellfish and replanting them in uncontaminated waters for a sufficient period of time to permit the shellfish to purge themselves of contaminants.

Another object of the present invention is to provide an improved method of obtaining marketable shellfish from contaminated waters by permitting the shellfish to purge themselves of contaminants within a minimum period of time and with a minimum loss thereof.

A further object of the present invention is a method of improving the yield of marketable shellfish that are obtained from contaminated waters and transported to uncontaminated waters to permit the shellfish to purge themselves of contaminants.

According to the present invention the foregoing and additional objects are obtained by providing an enclosure formed of a non-corrosive, angle bar open frame defining a bottom, at least four sides, and a top portion. Each of the bottom and four sides are covered with a non-corrosive, heavy gauge, mesh material. In the preferred embodiment, a pair of closure doors are provided for the open top portion. The pair of doors are each formed of a non-corrosive, flat bar, peripheral frame covered with a non-corrosive, heavy gauge, mesh material. The closure doors are hingedly connected to opposite sides of the enclosure and pivot toward the center of the enclosure. A non-corrosive T-bar extends across the midpoint of the enclosure top and is connected at its ends to the two sides of the enclosure perpendicular to the sides hinging the closure doors. When in the closed position, the closure door flat bar ends, opposite to the hinged ends, are in spaced adjacency and abut against the T-bar. An anchor eye is secured to the T-bar at substantially the midpoint thereof and serves to receive one end of a rope used to attach the enclosure to an identifying flotation buoy. The door ends abutting against the T-bar are each provided with an eyelet protruding therefrom and positioned so as to permit a suitable strip seal to pass through each eyelet. This seal is numbered and/or dated by the inspector and serves to maintain the doors closed and to identify the inspection status of the enclosure contents.

BRIEF DESCRIPTION OF THE DRAWINGS

A more complete appreciation of the present invention and many of the attendant advantages thereof will be readily apparent as the same becomes better understood with reference to the following detailed description when considered in connection with the accompanying drawings wherein.

Figure 1:
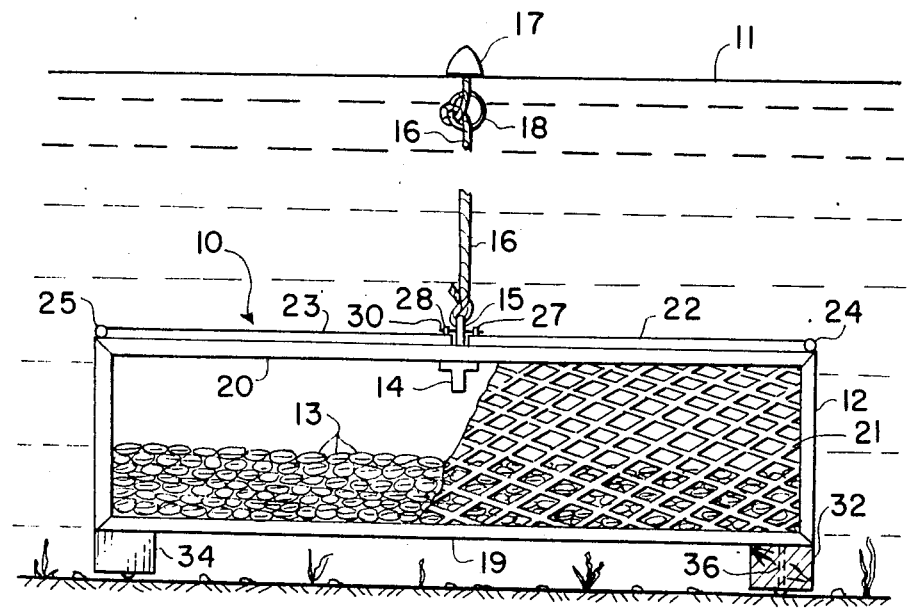
FIG. 1 is a view of the overall apparatus employed in the present invention, with parts broken away, as it would be seen in a body of uncontaminated water.

Referring now to the drawings, the apparatus of the present invention is generally designated by reference numeral 10 (FIG. 1) and includes an enclosure 12 housing a quantity of shellfish 13 therein and resting on the bottom surface of a body of uncontaminated water 11. Enclosure 12 is provided with a T-bar 14 spanning the width thereof at substantially the top center of the enclosure. An anchor eye 15 is secured at the midpoint of T-bar 14. A rope 16 having one end secured to anchor eye 15 and the other end thereof attached to a flotation buoy 17, serves as an aid in deploying and retrieving enclosure 12 in the body of water 11. A metal retriever ring 18 is also secured to rope 14 to provide a convenient grasping device for the equipment used to deploy and retrieve the enclosure from the body of water.

Enclosure 12 is formed of a non-corrosive angle bar open frame defining a bottom 19, four sides, (not designated) and an open top portion 20. Each of the sides and the bottom are closed by a heavy gauge, non-corrosive, mesh material as designated by reference numeral 21. The open top portion 20, in the preferred embodiment shown, is provided with a pair of closure doors 22, 23 hinged thereto along the top of opposite disposed sidewalls and as designated by reference numerals 24, 25. Closure doors 22, 23 are each formed of a flat bar non-corrosive peripheral frame with the same type heavy gauge, non-corrosive, mesh material attached to and spanning the peripherial edges thereof.

Figure 3:
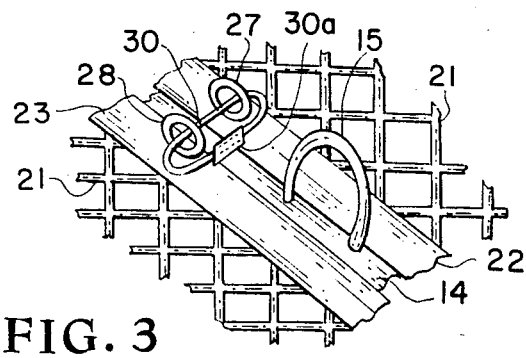
Figure 2:
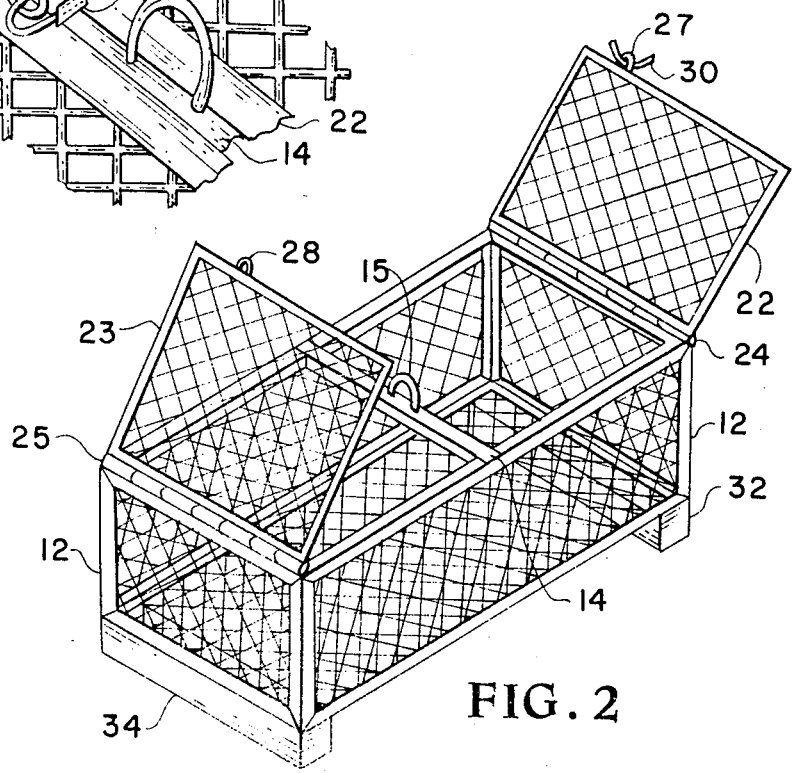
FIG. 2 is a view of the enclosure shown in FIG. 1 with the doors open and without any contents therein; and, FIG. 3 is a partial view of the top of the enclosure shown in FIGS. 1 and 2 showing details of the sealing apparatus therefor.

Closure doors 22, 23, are also provided, respectively, with individual eyelets 27, 28 as shown more particularly in FIGS. 2 and 3 on the peripherial edge thereof opposite to hinges 24, 25. Eyelets 27, 28 are disposed in spaced adjacency when doors 22, 23 are in the closed position resting on T-bar 14, as shown in FIG. 1. A removable strip seal 30, shown more clearly in open, broken position of FIG. 2 and closed sealed position in FIG. 3, passes through eyelets 27, 28 and is crimped at 30a in locked position to retain closure doors 22 and 23 in the closed position of FIG. 1. Seal 30 is added to enclosure 12 by the appropriate government inspector when enclosure 12 is loaded with the desired quantity of shellfish 13. The inspector appropriately marks seal 30 with his crimping tool at 30a to indicate a number and/or the date and the contaminated status of the shellfish contained in enclosure 12 is logged in his record book.

A pair of non-corrosive skid runners 32, 34 are attached to the bottom of enclosure 12 to maintain the enclosure spaced from the bottom of the body of water 11. Skid runners 32, 34 are bolted by a plurality of suitable bolts to the angle bar frame of enclosure 12. One such bolt is shown in dotted line in FIG. 1 and designated by reference numeral 36. In the preferred embodiment, skid runners 32, 34 are constructed of pressure treated wood and may be easily replaced when worn, or when replacement is needed, by removing bolt 36 and the other bolts, not designated.

In the preferred embodiment of the present invention the non-corrosive angle bars, flat bars and heavy gauge mesh material forming enclosure 12 are all constructed of stainless steel. The closing mesh material 21 is welded to the open frame formed by the angle bar segments, and to the peripherial frame formed by the flat bar segments for closure doors 22, 23. Also, the contacting ends of the angle bars forming the open frame, as well as the flat bars forming the peripheral edges of closure doors 22, 23 are all provided with welded connections.

The stainless steel mesh material employed in the preferred embodiment is three-quarter inch diamond mesh, while the angle bar segments forming the open frame is three-sixteenths inch by one-half inch angle bar. The flat bar for closure doors 22, 23 is three-sixteenths by one-half inch.

The preferred size for enclosure 12 is approximately one foot high with the four sides thereof being of identical three foot lengths. Official approval has also been obtained for use of four foot length sides. Thus, the volume of the enclosure 12 is selected from (1) one×three×three or nine cubic feet and (2) one×four×four or sixteen cubic feet. It has been determined that shellfish, and clams in particularly, can open and close adequately to feed when piled as much as six inches in depth. Accordingly, enclosures 12 in the present invention would be filled to approximately six inch depths when transported to, and deployed in, uncontaminated waters to thereby provide a potential loaded volume of four and one-half cubic feet in the three foot enclosures and eight cubic feet in the four foot enclosures.

The operation of the present invention is believed apparent from the above detailed description. Briefly, contaminated shellfish, for example hardshell clams, *Mercenaria mercenaria,* are harvested from known contaminated waters under the supervision of a Virginia Marine Resources Commission inspector or other government inspector. These contaminated shellfish are loaded within enclosures 12 to a depth of approximately six inches and the enclosure doors closed and sealed by the inspector. The loaded enclosure(s) are then transported to known uncontaminated waters where they are deployed, again under the control of the government inspector, to remain there for at least fifteen days. The location of the deployed enclosures 12 is marked by suitable identification buoy(s) 17 and other means, for example, wooden stakes, if deemed necessary.

After the fifteen day self-purging by the shellfish they are considered clean by Virginia State Health Department standards, and may be marketed. The enclosure 12 is retrieved by grasping ring 18 with suitable on-board harvesting gear and seal 30 may then be broken and the clean shellfish removed. The yield of this "second" harvest has proved to be approximately ninety-five percent of the first harvest with the approximately five percent loss being due to shell breakage during handling. This is a vast improvement over the approximately eighty percent maximum recovery where the shellfish are deployed directly onto the bottom of the uncontaminated water for their self-purging stay.

Although the invention has been described relative to a specific embodiment thereof there are numerous variations and modifications that will be readily apparent to those skilled in the art in the light of the above teachings. For example, although the two closures doors shown and described in the preferred embodiment close toward the center of enclosure 12, they could just as well be hinged at the center of the enclosure and close toward the edges. Also, in some instances, one enclosure door would be adequate and it could close toward the center or toward the edge surface of enclosure 12, as so desired.

Although the preferred embodiment has been described as being constructed of specific stainless steel parts, the invention is not so limited and it will be obvious to those skilled in the art that any non-corrosive materials may be employed in the practice of the present invention as long as the materials are of adequate structural strength to withstand the handling and water current pressures for the purposes intended.

The skid runners 32, 34 in the preferred embodiment are formed of four-inch square lengths of pressure treated wood, however, they may be formed of other non-corrosive materials such as heavy duty plastic, aluminum or stainless steel I-beams, as long as they perform the function of maintaining enclosure 12 spaced from the bottom surface of the body of water adequately to permit water flow to all portions of enclosure 12.

These and other modifications of the present invention will be readily apparent to those skilled in the art in the light of the above teachings.

It is therefore to be understood that, within the scope of the appended claims, the invention may be practiced other than as specifically described.

What is claimed as new and desired to be secured by Letters Patent of the United States is:

1. Apparatus for transporting harvested contaminated shellfish from contaminated waters to uncontaminated waters and for housing the contaminated shellfish for a predetermined time in the uncontaminated waters to permit the shellfish to purge themselves of contaminants and become marketable, comprising:
   an enclosure for housing the shellfish,
   said enclosure including a non-corrosive angle bar open frame defining a bottom, at least four sides and a top portion,
   each said bottom and sides having heavy gauge mesh material secured to segments of said angle bar open frame so as to define a perforate box-like structure having an open top,
   a pair of closure doors for said open top and rotatably secured to the open top of said perforate box-like structure,
   each one of said pair of closure doors being formed of a flat bar peripherial frame and a heavy gauge mesh material spanning said peripherial frame and secured thereto,
   each one of said pair of closure doors having one peripherial side thereof hingedly connected to opposite sides of said enclosure at the top portion thereof and pivotally movable about the hinged connection from a closed position closing the open top of said enclosure to an open position wherein said enclosure may be selectively filled and emptied of the contents thereof,
   a T-bar secured to said top portion and spanning the open width of said enclosure at substantially the midpoint thereof,
   said pair of closure doors each having the peripherial side that is opposite to the hinged peripherial side being adapted to abut against the top of said T-bar when said pair of doors are in closed position, and
   means for selectively securing said closure doors against the top of said T-bar to thereby form a sealed closure for said open top.

2. The apparatus of claim 1 including eyelet means on each of said pair of doors and adapted to be disposed in spaced adjacency when said doors are in closed position, said means for selectively securing said closure doors being a removable strip seal disposed within said eyelet means to thereby secure said closure doors in closed position and to indicate inspection status of the shellfish housed in said enclosure.

3. The apparatus of claim 1 including at least one anchor eye secured at substantially the mid-length of said T-bar, rope means having one end thereof secured to said anchor eye and the other end thereof secured to an identifying flotation buoy, ring means secured to said rope means in spaced adjacency to said flotation buoy and serving to assist in deploying and retrieval of said enclosure from a body of water, at least a pair of non-corrosive skid runners secured to the bottom of said enclosure at opposite ends thereof and serving to maintain said enclosure spaced from the bottom of the body of uncontaminated water to assist in water flow to all surfaces of said enclosure, said skid runners being releasably bolted to angle bar segments of the bottom of said enclosure, and said non-corrosive skid runners being constructed of a material selected from the group of materials consisting of pressure treated wood, plastic, stainless steel and aluminum.

4. The apparatus of claim 1 wherein said angle bars, said flat bars and said heavy gauge mesh material are all constructed of stainless steel and said mesh material and the contacting ends of the angle bars forming said open frame and the flat bars forming said peripherial frame are all provided with welded connections, said mesh material being a three-quarter inch diamond mesh, said open frame a three-sixteenths by one and one-half inch angle bar, said flat bar is three-sixteenths by one and one-half inch and wherein said enclosure is approximately one foot high and the four sides thereof are of identical length and selected from the lengths of three feet and four feet each.

5. A method of harvesting marketable shellfish comprising the steps of:
   (a) dredging a quantity of contaminated shellfish from a known contaminated body of water source,
   (b) providing an open foraminous container having a pair of closure doors and a known internal volume,
   (c) loading a quantity of the contaminated shellfish in the foraminous container so as to occupy approximately one-half of the volume thereof,
   (d) sealing the foraminous container closure doors in closed position with a numbered and dated identification seal,
   (e) transporting the loaded foraminous container to a known uncontaminated body of water,
   (f) securing an identifying flotation buoy to the loaded foraminous container with a suitable rope having a ring attached thereto to assist in placing and retrieving the foraminous container in the body of uncontaminated water,
   (g) placing the loaded foraminous container in the known uncontaminated body of water with the location there being marked by the identifying flotation buoy,
   (h) maintaining the loaded container within the uncontaminated body of water for at least fifteen days,
   (i) retrieving the loaded container from the uncontaminated body of water,
   (j) breaking the identification seal on the loaded container and recovering a yield of marketable shellfish from the container.

6. The method of claim 5 wherein the known volume of the foraminous container is approximately nine cubic feet.

7. The method of claim 5 wherein the known volume of the foraminous container is approximately sixteen cubic feet.

8. The method of claim 5 including the step of maintaining the loaded container adjacent but spaced from the bottom of the uncontaminated body of water to insure water flow to all surfaces of the container and wherein the yield of marketable shellfish recovered is approximately ninety-five percent of the contaminated shellfish placed in the container.

9. The method of claim 5 wherein the marketable shellfish comprise edible marine bivalve mollusks.

10. The method of claim 5 wherein the marketable shellfish comprise the round hard shelled clams, *Mercenaria mercenaria*.

* * * * *